United States Patent
Konen

[15] 3,705,645
[45] Dec. 12, 1972

[54] INFLATABLE FLEXIBLE CONTAINER AND FABRIC FOR MAKING IT

[72] Inventor: Patricia F. Konen, Feasterville, Pa.

[73] Assignee: Rohm and Haas Company, Philadelphia, Pa.

[22] Filed: April 30, 1971

[21] Appl. No.: 139,224

[52] U.S. Cl. ..........................206/46 R, 5/337, 150/1, 161/44, 161/89, 161/92, 161/231, 161/254, 229/55, 244/118 P, 280/150 AB
[51] Int. Cl. ....................B65d 85/00, D03d 11/00
[58] Field of Search .........5/337, 348, 348 WB; 52/2; 161/44, 88, 252, 277, 256, 247, 404, 249, 254, 231, 89, 92; 117/161 UC; 244/118 P; 280/150 AB; 9/314; 206/46 R; 138/12 S; 139/389, 390; 150/1; 229/55; 220/83; 293/70

[56] References Cited

UNITED STATES PATENTS

| 2,719,832 | 10/1955 | Craemer et al. | 117/161 UC |
| 3,012,911 | 12/1961 | Moser | 161/249 X |
| 3,616,146 | 10/1971 | Gabet | 161/88 |

Primary Examiner—William J. Van Balen
Assistant Examiner—Henry F. Epstein
Attorney—George Simmons and Carl A. Castellan

[57] ABSTRACT

Textile fabrics are formed into containers, envelopes, or bags which are adapted to be partially or completely filled with a fluid, e.g. water or other liquid or to be inflated with air or other gas. A coating of an acrylic addition polymer is provided on one face of the flexible fabric and covered with a layer of fibrous material. The fiber-coated face becomes the interior wall of the container and prevents adhesion of adjacent internal walls when the container is in collapsed condition. This permits storage of the container in collapsed condition over long periods of time and at temperatures ranging from −20° to 200°F. without developing cracks in the coating or adhesion of the internal surfaces and thereby interfering with the inflation of the container. Such containers are useful as air-mattresses, water-filled mattresses, sleeping bags, pillows, lifebelts, lifeboats, air-filled or water-filled chairs, ottomans, etc. They may be stored in automobiles or other vehicles for automatic inflation upon collision impact to protect passengers therein from injury by cushioning effect.

10 Claims, No Drawings

INFLATABLE FLEXIBLE CONTAINER AND FABRIC FOR MAKING IT

DESCRIPTION OF THE INVENTION

The present invention is especially concerned with so-called "air-bags" that are presently being developed for safety purposes to cushion a passenger or passengers in a vehicle, such as an automobile, taxicab, bus, truck or the like, in the event of an accident wherein the passenger vehicle undergoes collision and the impact throws the passenger(s) therein against rigid parts of the vehicle, such as the dashboard, door, seat, windshield, or the like. Any suitable system may be used for automatically inflating the air-bag upon impact and that is not part of this invention. For example, the interior of the air-bag may be connected to a compressed air cylinder by means of a conduit in which there is a cock or valve constructed or arranged to open or be opened by any suitable mechanism, such as an electrical relay or switch, which is energized upon impact of predetermined severity.

At the present stage of development, the envelope of the air-bag generally comprises a textile fabric, such as a woven nylon fabric of reasonably tight weave and the internal surface of the bag is generally coated with Neoprene which has the disadvantage characteristic of natural rubber and the synthetic rubbers made of polymers of diethylenically unsaturated monomers, such as butadiene, isoprene, and the like, namely the tendency to oxidize on ageing and develop tackiness or become brittle as a result of oxidation during such ageing process.

Attempts have been made to replace the Neoprene coating with a coating of an acrylic addition polymer. Such a polymer overcomes the ageing changes that occur with diene polymers but another problem arises. When an acrylic polymer is applied that retains flexibility (and freedom from cracking) at low temperature down to −20°F., such a polymer is tacky at elevated temperatures and the internal walls of the bag when stored in collapsed state adhere together and interfere with or may even prevent inflation.

In accordance with the present invention, an inflatable container, such as an air-bag, sleeping bag, air mattress, water-filled mattress and gas-filled lifeboat and life-preserver, is provided with an acrylic polymer coating to the exposed surface of which a fibrous covering or coating is adhered. The acrylic polymer coating should retain flexibility without cracking at temperatures down to −20°F. In general, to accomplish this objective, an acrylic polymer is chosen that has an apparent second order transition temperature, herein designated $T_i$, of about −20°F. or lower, such as down to −50°F.

The $T_i$ value referred to is the apparent second order transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ value here used is that determined at 300 kg./cm.$^2$.

Polymers of acrylic esters, and especially homopolymers and copolymers of n-butyl, isobutyl, or higher ($C_5$–$C_{16}$) alkyl acrylate(s) meet the transition temperature requirement and n-butyl acrylate homopolymers and copolymers are preferred. Copolymers of n-butyl acrylate and methyl acrylate, ethyl acrylate, or mixtures thereof, in which the butyl acrylate may be present in any proportion also meet this requirement. Similarly copolymers of ethyl acrylate and isobutyl methacrylate in any proportions are suitable, Copolymers of a butyl acrylate or a higher alkyl ($C_5$–$C_{15}$)acrylate may also contain one or more polymerized components which, if homopolymerized, would produce hard polymers having $T_i$ values above −20°F. even up to 300°C., provided the amount of the hardening monomer(s) is not so high that the $T_i$ of the resulting copolymer is above −20°F.; methyl methacrylate, ethyl methacrylate, and ($C_3$–$C_5$)alkyl methacrylates, are examples of such hardening monomers. Thus a copolymer of at least about 70 percent by weight of n-butyl acrylate with vinyl acetate, vinylidene chloride, ethyl methacrylate or any higher alkyl ($C_3$–$C_{18}$)methacrylate meets the $T_i$ requirement of the invention. Also copolymers of at least 75 percent by weight of a butyl acrylate will even tolerate such hard monomers as methyl methacrylate, acrylonitrile, styrene, vinyltoluene, vinyl chloride, hydroxyethylmethacrylate, and hydroxypropyl methacrylate. If part or all of the butyl acrylate is replaced with a higher alkyl ($C_5$–$C_{16}$)acrylate, such as 2-ethylbutyl, 2-ethylhexyl, decyl, dodecyl, or tridecyl acrylate or by a mixture of two or more of such higher alkyl acrylates, then the copolymers thereof may contain an even larger proportion of the hard monomer. For instance, copolymers of 2-ethylhexyl acrylate may contain as low as 60 to 65 percent thereof with the balance of 35 to 40 percent by weight being derived from methyl methacrylate or any of the other hardening monomers mentioned above or mixtures of two or more hardening monomers. The butyl acrylate may also be partly or entirely replaced by higher alkyl ($C_6$–$C_{16}$)methacrylates. Thus, copolymers of 70 to 75 percent or more of isodecyl methacrylate and the balance, to make 100 percent, of methyl methacrylate, or any of the other hardening monomers meet the $T_i$ criterion above.

Preferred acrylic polymers for use in the present invention are those which are curable or cross-linkable to provide a heat-resistant and solvent-resistant condition in the coating. For this purpose, the polymers may comprise units having reactive groups of the vic-epoxy type or N-methylol or N-alkoxymethyl type, the alkoxy group in the latter case having from one to 18 carbon atoms, preferably one to two carbon atoms if an aqueous coating system is used and one to four carbon atoms if a non-aqueous coating system is used, such systems being either solutions or dispersions wherein the polymer is soluble or insoluble respectively in the aqueous or non-aqueous liquid medium.

Examples of the vic-epoxy type of reactive group include glycidyl acrylate, glycidyl methacrylate, glycidyl vinyl ether, and glycidyl vinyl sulfide. Examples of the N-methylol type of reaction group include the formaldehyde reaction products of an $\alpha,\beta$-monoethylenically unsaturated carboxyl-amide, such as N-methylolacrylamide, N-methylolmethacrylamide, N-methylol-itaconamic acid, the methyl or ethyl ester of N-methylol-itaconamic acid, N-methylol-4-pentenamide; also the formaldehyde reaction products of monoethylenically unsaturated monomers having a group

and a ureido group, such as:
N-methylol-β-ureidoethyl vinyl ether of the formula
H₂C=CHO—CH₂CH₂—NH—CO—N(H)CH₂OH,
the corresponding sulfide of the formula
H₂C=CHS—CH₂CH₂—NH—CO—N(H)CH₂OH,
N-methylol-β-ureidoethyl acrylate of the formula
H₂C=CHCOOCH₂CH₂—NH—CO—N(H)CH₂OH,
the corresponding methacrylate which may also be called
N-methylol-N'-β-methacryloxyethyl-urea, or a cyclic ureido group, such as:
N-vinyl-N'-methylol-N,N'-ethyleneurea
N-vinyloxyethyl-N'-methylol-N,N'-ethyleneurea
N-(β-methacrylamidoethyl)-N'-methylol-N,N'-ethyleneurea
N-(β-acrylamidoethyl)-N'-methylol-N,N'-ethyleneurea
N-(β-methacryloxyethyl)-N'-methylol-N,N'-ethyleneurea
N-(β-acryloxylethyl)-N'-methylol-N,N'-ethyleneurea.

Another important group of N-methylol compounds that are useful herein are aminotriazines in which an N-methylol group is substituted on an amino group, the nitrogen atom of which is attached directly to a carbon atom of a 1,3,5-triazine ring such as:
N-methylol-acryloguanamine,
N-methylol-methacryloguanamine,
N-methylol-3-butyroguanamine,
N-methylol-4-pentenoguanamine.

Besides the N-methylol derivatives of the amido, ureido, and 1,3,5-triazine compounds mentioned above, the corresponding N-methoxymethyl and ethoxymethyl derivatives are useful in aqueous systems and the corresponding N—(C₂—C₁₈)-alkoxymethyl, especially the butoxymethyl derivatives, are useful in non-aqueous systems.

All these alkoxymethyl derivatives are known and made by etherification of the N-methylol derivatives with a (C₁—C₁₈)alcohol in known fashion.

The amount of the reactive monomers in the copolymer may be from 0.2 to 10 percent and is preferably from 0.5 to 5 percent by weight based on the weight of the copolymer.

The copolymer, whether it contains a reactive monomer of the vic-epoxy, N-methylol, or N-alkoxymethyl type, may also contain up to about 5 percent by weight of an unsaturated acid or amide copolymerized therein, such as acrylic acid, methacrylic acid, itaconic acid, the monomethyl ester of itaconic acid, acrylamide, and methacrylamide. Similarly, the copolymers may contain monomer units derived from β-hydroxyethyl methacrylate, β-hydroxypropyl acrylate or the like, such units being present preferably in amounts up to 10 percent, but most preferably no more than about 5 percent, by weight of the copolymer.

If the copolymer contains carboxylic acid, amide or hydroxyl groups, an external crosslinking agent may be included in the aqueous or non-aqueous solution or dispersion that is used for coating purposes. Examples of such crosslinkers include poly(vic-epoxides) e.g., one of the formula

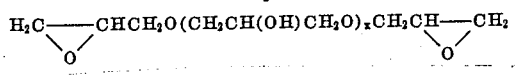

where x is a number having an average value of 1 to 3, and also the formaldehyde reaction products of phenol, urea, thiourea, and aminotriazines, such as melamine and benzoguanamine, and the (C₁-C₁₈)alkoxymethyl derivatives thereof, especially the methoxymethyl, ethoxymethyl, and butoxymethyl derivatives. The amount of such external cross-linker may be from 1 to 12 percent by weight based on the weight of copolymer.

Whether the copolymer is self-curing or self-cross-linking by virtue of vic-epoxy, N-methylol, or N-alkoxymethyl groups or not, or is to be reacted with an external cross-linker of the phenoplast or aminoplast type just mentioned, an acidic catalyst may be provided in a small amount to hasten the curing; examples include ammonium chloride, p-toluenesulfonic acid, oxalic acid, formic acid, dichloroacetic acid, and the volatile amine salts, such as the 2-amino-2-methyl-1-propanol hydrochloride. The amount of such catalyst, if used, may be from 0.1 to 1.5 percent of the total composition or about 0.5 to 1 percent of the reactive phenoplast or aminoplast therein.

The acrylic copolymers used may be made by conventional solution or emulsion polymerization techniques which may but need not involve the use of a chain transfer agent, such as methallyl chloride or dodecyl mercaptan. The molecular weight is not critical and may fall within a wide range from about 25,000 up to 11,000,000 viscosity average or intrinsic viscosity. Solution polymerization can be used to prepare polymers having up to about 200,000 whereas emulsion polymerization can be used to prepare copolymers having from 100,000 or less up to eleven million or so molecular weight.

The binder polymer that is resistant to cracking at low temperatures and remains flexible at such low temperatures as −20°F. or lower may be applied to the fabric in a suitable vehicle, such as in an organic solvent solution or in the form of an aqueous dispersion, such as is obtained by emulsion polymerization. The organic solvent solution may be made of high viscosity simply by increasing the concentration of the polymer and it may include auxiliary materials such as a filler or pigment, a thickening agent, or the like. Likewise, the composition that is applied may be an aqueous dispersion of a polymer and this dispersion may include a dispersed filler or pigment, a thickening agent or the like. Examples of fillers and pigments include clay, calcium carbonate, talc, silica, titanium dioxide, lithopone, the copper phthalocyanine pigments, iron oxide, lead chromate and the like. As thickening agents there may be used in aqueous systems; hydroxyethyl cellulose, methyl cellulose, polymers of acids, such as polyacrylic acid, polyethacrylic acid, and emulsion copolymers containing large amounts of an acid, such as acrylic acid or methacrylic acid, such as from 30 – 90 percent by weight of the acid with the balance to make 100 percent of an ester of acrylic acid or methacrylic acid e.g., ethyl acrylate or methyl acrylate. The latter thickeners when added to the polymer dispersion in acid form can be modified by partial or complete neutralization with a base such as ammonium hydroxide, sodium hydroxide, potassium hydroxide or the like to produce the desired viscosity.

In general, the coating composition, if aqueous, may comprise the following:

| | Parts by Weight |
|---|---|
| Binder Copolymer | 30 to 75 |
| Thickener | 0.1 to 10 |
| Pigment | 0 to 25 |
| Alkaline material (e.g. NH$_4$OH) to desired viscosity Water, to make a total of 100 | |

If the coating composition is a solution in an organic solvent, the binder copolymer may have a concentration of 25 to 60 percent by weight, preferably about 40 to 50 percent and the content of pigment may be 0 or up to 40 percent on the weight of polymer. If the coating composition is of non-aqueous dispersion type, the organic liquid may be a more less volatile liquid, such as an aliphatic hydrocarbon or a mixture of several such hydrocarbons having different volatilities, the amount of polymer suspended therein may be 40 percent or less up to 70 percent or more, and optionally it may contain up to 40 percent by weight of pigment on weight of polymer, and, if necessary, a thickener to assure a viscosity of at least 10,000 cps.

The fabric that may be used to form the main component of the enclosure for the various air bags may be a woven or knitted fabric but is preferably a woven fabric in which the yarns are reasonably tightly woven. The yarns used to make the fabric may be of nylon; polyesters such as polyethylene glycol terephthalate; polyacrylonitrile and its copolymers with vinyl chloride, vinyl acetate, methyl acrylate with or without amine containing monomers such as 4-vinylpyridine; copolymers of vinyl acetate and vinyl chloride, etc.

Before the fabric is formed into a closed envelope or bag it is coated on one or both surfaces with the acrylic polymer defined hereinabove. The amount of the coating deposited may be from about ½ to 3 oz. per sq. yard of the fabric and preferably is about 1 – 2 oz. of the solid acrylic polymer deposited per sq. yard. The thickness of the coating may be from ½ to 10 mils and is preferably 1 ½ to 5 mils. Preferably, only that side of the fabric is coated which is to serve as the interior wall of the enclosure, envelope, container or bag. The coating serves to seal all interstices of the fabric so that on inflation of the bag made therefrom little or no leaking of the gas is permitted even at such reasonably high pressures as fully distend the envelope to a taut condition. By applying the coating of the acrylic polymer hereinabove defined the deposit retains flexibility at least down to −20°F. The cold flex test that the fabric is subjected to is as follows: The coated fabric is placed in a cold box at constant temperature (−20°F., −30°F., or −40°F.) for ½ hour. At this time, the sample is grabbed quickly and crumpled in the hand. The coating is inspected for cracks. Also a second chilled coated fabric sample is tested for stiffness by the Drape Flex Test, ASTM Test for Stiffness of Fabrics No. D1388 Option A Cantilever Test.

The coated fabric obtained as a result of applying the coating composition containing an acrylic polymer as defined hereinabove to a continuous film on the fabric may be formed into an envelope in any suitable manner. For example, this may be accomplished by juxtaposing two such coated fabrics with the coated surfaces facing each other and sealing the edges of the adjacent coated fabrics except at a point of introduction of liquid or gas which may be accomplished by means of a tube extending between the edges. The sealing may be effected by pressing the edges together at room temperature or at an elevated temperature to 50°C. or higher, thereby fusing the coatings together. Of course, if desired there may be other points of sealing the edges and these are preferably provided after sealing the envelope to a condition wherein it is not fully distended and then pressing each side of the envelope between two grids or platens having raised relief areas with intervening recessed areas. For example, the platen may have parallel raised areas in the form of parallel lines of narrow widths such as 1/16 to 1/4 inch. One of the platens may be flat and the opposed platen may be provided with the raised lines so as to press the opposed faces of the envelope together along the lines. The sealing to join the coatings by fusion where they make contact may be accomplished at room temperature. However, higher temperatures may be employed such as temperatures up to 40°C. or more. Besides having parallel lines on one or both of the platens, the latter may be provided instead with a grid of intersecting lines, one set being at right angles to the other or, if desired, at any other angle.

Instead of relying on sealing the edges by fusion of the two coatings that make contact therebetween with or without heating as by a heated platen, the two sheets that are formed into the envelope may be joined by a seam applied by a sewing machine or by hand sewing.

Envelopes thus prepared which are sealed at the edges or sewn around the edges are then filled partially or completely with a fluid, such as a liquid, especially water, or inflated and, if desired, finally sealed at intervening areas, as along lines, either parallel or intersecting, are suitable for many purposes and the fact that the interior coating remains somewhat tacky does not interfere with the use of the envelope since no blocking or adherence between walls occurs as a result of any adhesion upon contact of the interior walls of the inflated envelope simply because in normal use no collapsing or deflation occurs.

However, for many purposes and in particular for the making of air bags to be used as a safety device in vehicles, wherein the bag is stored in a compact collapsed condition with large areas of interior surfaces of the coated fabric in contact with juxtaposed surfaces and inflation occurs only on impact, the coated fabric merely having an acrylic polymer as so far defined would not be suitable. In accordance with the present invention the problem of preventing adherence of the interior walls of the envelope is prevented by applying a layer of fibrous material to the exposed surface of the coating of acrylic polymer on the fabric before it is assembled into the inflatable envelope. The thickness of the layer of fibers needed to prevent the adherence of the interior walls of such an envelope when the latter is stored in completely collapsed condition wherein the opposed surfaces of the internally coated walls are in contact with each other over a large area need not be large. Adequate thickness to protect these surfaces from adhering is provided by the application of tissue paper having the thickness of a single ply of facial tissue or toilet tissue.

The fibrous layer may be composed of a non-woven material formed of fibers either of textile length or of short lengths commonly employed for the making of papers or it may even comprise a mixture of fibers of widely differing lengths. The preferred embodiment of the fibrous layer is a non-woven material in which the fibers are essentially unbonded or, at the most, lightly bonded either by fusion of the fibers themselves in the case that some of them are of potentially adhesive character or by the use of an adhesive material.

The permissible extent of bonding that can be tolerated in any given non-woven material depends on the particular fibrous material, its fiber-length and diameter, the disposition of the fibers in the non-woven structure, and the particular arrangement or distribution of the adhesive or binder. In general, however, the amount of binder in the non-woven sheet should not be over 5 percent by weight of the fiber weight and preferably it is less than 2 percent by weight thereof or even completely absent.

When a textile non-woven is employed, it may contain fibers of textile length such as from about ½ inch length even up to several inches in length and any of the common textile fibers may be employed. If the fabric of the envelope is coated on both sides, the choice of fiber may depend upon the particular feel that may be desired. Thus cotton, rayon, wool, silk, and linen are typical textile fibers that may be employed. If desired, however, such fibers as nylon, polyethylene glycol terephthalate, casein, fibers of vinyl resins, such as those formed from copolymers of vinyl chloride with vinyl acetate, of acrylonitrile with methyl acrylate or of an ester copolymer, such as a copolymer of ethyl acrylate, methyl methacrylate and methacrylic acid, may be used. The use of textile length fibers in making the non-woven enables one to produce the non-woven material on such equipment as a card, a Rando-webber, or a garnett. If desired, a plurality of webs obtained from such devices may be superimposed to provide the thickness desired in the non-woven layer of the facing element. In general, the thickness employed may vary from 1 to 15 mils or greater. The use of greater thickness up to about 50 mils is permissible but generally not preferred because fibers in the fibrous layer may come loose during normal handling and usage, especially when folding is involved. The reason for this is simply that it is undesirable to have an appreciable amount of binding agent in the layer of fibers and hence the unbonded or lightly bonded fibers may become loose during subsequent use. When the fibrous layer is a heavy one and reliance is placed on adhesion of the fibers therein to the coating, many of the fibers may be insufficiently secured to prevent such loosening.

The fibrous layer is preferably unbonded but it may be lightly bonded as already stated. When it is of bonded type it is preferable that the bonding is effected by application of discrete small areas of the bonding agent such as at spaced small dots or spots. When such a lightly bonded nonwoven layer is laminated to the acrylic coating film on the interior and/or exterior face of the envelope of the present invention, the adhesion of the non-woven web or fabric to the film may involve contact of these bonded dots or spots with the surface of the film. In so bonding the non-woven to the film the fibers between spots are adapted to shift rather freely under quite low forces. This assures that the non-woven facing does not develop a puckered disposition or appearance which may be particularly undesirable when it is employed for any external facing. Blotting paper may be used. The fibers applied may be crimped. A creped paper may also be used. The use of crimped fibers, either of textile length or in a paper assures that they adhere to the surface of the acrylic coating at points of small area rather than extensive areas along the length of the fibers.

The basis weight of the non-woven web or paper may be expressed in terms of the typical paper units, namely the weight in pounds of a 480-sheet ream in which the sheets have dimensions of 20 × 30 inches. In general, non-woven materials including papers having a basis weight of about 3 – 25 lbs. may be employed and from 4 – 15 lbs. in preferred embodiments. However, heavier non-woven sheets may be employed even up to a basis weight of 120 pounds particularly when an unsized, unbonded paper of high absorptive characteristics is used such as blotting paper, if some stiffening of the envelope wall can be tolerated.

Cellulosic fibers obtained from wood pulp as in the normal manufacture of paper are quite satisfactory for the tissue layer used in the present invention. However, fibers of appropriate shortness in length formed of cotton, regenerated cellulose or of wool, linen, silk, or of synthetic resins, such as nylon, cellulose acetate, casein, vinyl or acrylic resins as acrylonitrile polymers may be employed alone or in admixture with each other and particularly in mixture with wood pulp fibers or alpha-cellulose fibers.

While the fibrous tissue should not be sized in the normal sense of the term nevertheless it may be of a type adapted to hold together when treated with aqueous media and for this purpose it may contain from 1 to 3 percent, on the weight of the fiber, of various materials imparting wet-strength, especially aminoplasts such as condensates of melamine or urea or mixtures thereof with formaldehyde.

Preferred papers are made from bleached or unbleached sulfite, kraft, alpha-cellulose fibers, rag fibers or mixtures thereof having the appropriate length as specified hereinabove.

As stated before, all of the fibers in the non-woven textile or paper may be of cellulosic type or of other types which are non-adhesive in character, that is they are not rendered adhesive on heating. However, if desired, a proportion of the fibers up to about 10 percent by weight thereof, may be of a type which is of potentially adhesive nature, that is they are adapted to become tacky and adhesive upon heating, such as fibers made of thermoplastic or thermosetting resins including acrylic or vinyl polymers. The presence of such potentially adhesive fibers in the tissue favors the bonding of the fibers of the tissue to the coating.

Preferably, the non-woven textile or paper is completely unbonded except to the extent that bonding of the fibers may occur when a wet-strength resin is employed in the amounts mentioned hereinabove. Such wet-strength resins may be employed to provide a wet-strength of 0.04 lb. to 0.1 lb. per inch per pound of basis weight.

Besides using a thin paper tissue which can simply be pressed against the surface of the coating that is to form the interior wall of the envelope, such pressing being effected at room temperature or temperatures slightly above, such as 40°C., there may instead be applied to the coating a flocked fiber or even a textile fabric although such expedients unnecessarily increase the weight of the coated fabric to an extent that in some instances may not serve any good purpose. However, there may be other instances where it is desirable to have a relatively heavy deposit of fibers on the face of the coating on the fabric whether this coating is only on the inside or is both on the inside and outside of the fabric. For example, in some instances it is desirable to stiffen the structure of the envelope wall and this can be effected by supplying a rather heavy deposit of fibers on the interior coating. It also may be desirable for esthetic reasons to supply a heavy fibrous layer to the exposed surface of a coating that is external to the envelope particularly when the inflated envelope is to be used as a mattress or pillow. In such instances particularly the fibrous layer generally enhances the warmth of the inflated bag and makes it more comfortable to the person using it.

In all instances of application of the fibrous layer to the coating, the coating may be stiffened and/or its adhesiveness enhanced by heating the coating immediately prior to or at the time of application of fibrous material. In most cases with the acrylic polymers described hereinabove only a moderate increase in temperature is required to provide adequate adhesiveness at the time of application of the fibers. For example, temperatures which are from 5° – 30°C. above normal room temperature may be fully adequate to adhere the fibers or fibrous layer or fabric to the exposed surface of the coating.

However, when the preferred coatings are used, i.e., those of copolymers which are self-curing by virtue of vic-epoxy, N-methylol, or N-alkoxymethyl groups therein or those containing copolymers having reactive groups having reactive hydrogen atoms and external cross-linkers such as an aminoplast, phenoplast, or polyepoxide, it is generally desirable to subject the fiber-covered coating to elevated temperatures, such as up to about 95° to 165°C. for 3 to 35 seconds while being pressed at ½ to 100 psi, preferably not over 5 – 15 psi. These conditions assure adequate curing in a short period of time to reduce the tendency of internal coated surfaces to block or adhere on contact. Good chemical bonding between the polymer of the coating and the fibers deposited thereon is obtained when these two components have inter-reactive groups.

By providing a fibrous layer on the exposed surface of the coating which is within the envelope or by applying it to both an external as well as internal coating it has been found that the coated fabric or envelope is easily rendered resistant to adhesion or blocking even under such a severe blocking test as pressing two such coated surfaces together at 200°F. at ½ pound per square inch for 7 days. Thus the fiber-faced coated fabric of the present invention not only provides excellent flexibility even at temperatures as low as −20°F. but also resists adhesion between the contacting fiber-faced coated surfaces at 200°F. for seven days. The last is a severe test which assures that storage of a collapsed air bag in a vehicle over a long period of time even at the highest temperatures normally encountered in hot climates will not result in adhesion of adjacent interior surfaces of the collapsed envelope and thereby prevent inflation on impact.

To assist those skilled in the art to practice the present invention, the following modes of operation are suggested by way of illustration, parts and percentages being by weight and the temperature in °C. unless otherwise specifically noted.

1. a. An 43 × 43 fabric woven of a 900 denier, 900 filament nylon is wet with water and then it is coated on one side with a composition comprising a mixture of (1) 200 parts of an aqueous 50 percent solids dispersion containing an emulsion copolymer of 95 percent n-butyl acrylate and 5 percent ethyl acrylate and (2) 5 parts of a pigment (specifically Toluidine Red) thickened to 50,000 cps. (Brookfield Viscometer LVF, spindle No. 4/6 spindle speed at 25°C.) by the addition of 5 parts of a 40 percent solids aqueous dispersion of an emulsion copolymer of about 60 percent ethyl acrylate and about 39 percent methacrylic acid and ammonium hydroxide till the viscosity desired is reached. The coating is spread to uniform thickness by a suitable doctor knife. The coated fabric is dried by passage through an atmosphere heated to 140°F. leaving a coating deposit of about 2 – 3 mils thickness.

b. The coated fabric is chilled to −20°F., −30°F., and −40°F. in accordance with the cold flex test and remains highly flexible. Flexing of the cold fabric at these temperatures even through a 180° angle does not cause cracking of the coating. An air-bag or envelope is formed by laying the fabric with its coated face up on a flat table or bed and then lightly folding the coated fabric over on itself with a small flexible plastic tube extending between the overlapped panels adjacent and alongside one end of the fold. A rigid pressing element having a U-shaped rib is brought down on the folded fabric with the opening of the U coincident with the folded edge while forcing air through the tube to keep the overlapped "leafs" of the fabric from contact except along the U-shaped rim of the pressing element. The coating is tacky enough to form a strong adhesive bond along a U-shaped line which, with the fold, form an enclosed bag or envelope into which the flexible plastic tube extends. When this bag is filled with gas, the tube may be pinched or cut off to seal it off. The tube may be made of thermoplastic material so that it may be sealed by heat adjacent the point of pinching or cut-off.

c. The envelope or bag formed in part a. is suitable for use as a cushion. However, if it were to be collapsed and stored in that condition over any appreciable length of time, the tackiness of the internal coating is such that substantial adhesion would develop between the coatings on the internal walls where they come into contact under the pressure exerted either by gravity or the constrictions resulting from folding the bag into compact form for storage in a passenger vehicle. Such adhesion would interfere with the requirement for rapid inflation on impact. This adherence would be aggravated by the heat developed inside the vehicle when it is allowed to stand in the hot sun.

d. The coated fabric obtained in part a. hereinabove is laminated with a fibrous layer in adherent contact with the coating. The lamination is effected by pressing a tissue paper having a basis weight of 25 lbs. against the exposed surface of the coating on the coated fabric at a pressure of 10 lbs. per sq. in. at 300°F. for 2 seconds. The fiber-coated faces of two such laminates are brought into contact and held in contact for 7 days at 200°F. and under 0.7 psi in one instance and in another for 24 hours at 140°F., 100 percent relative humidity and 0.5 psi. After these severe tests the fabrics show no blocking, and separate easily.

An inflatable air-bag formed from this laminate with the fiber-coated faces on the inside of the bag and stored in a passenger vehicle for a long period of time even in a hot climate retains its freedom from internal adherence and ready inflatability.

2. A nylon fabric similar to that of Procedure 1 a. is coated on one face with a composition comprising 200 parts of (1) an aqueous dispersion of an emulsion copolymer of about 96.4 percent butyl acrylate and about 3.6 percent N-methylol methacrylamide having a $T_i$ of $-45°F$. (2) about 5 parts of the pigment, Toluidine Red, (3) 5 parts of the same thickening copolymer dispersion as is used in 1 a) above, and (4) about 2 parts of 14 percent ammonium hydroxide to a viscosity of 110,000 cps. On drying, the thickness of the coating is about 3 mils. Then a creped paper (of the type used for facial tissue) having a basis weight of 5.5 lbs. is laminated with the coated fabric with the paper layer in contact with the exposed face of the coating using a pressure of 3 lbs. per sq. in. at 250°F. for 3 seconds. The laminate retains flexibility and is free of cracks when cooled even down to $-40°F$. When two such laminates are placed with their paper-bearing faces in contact and pressed together for 7 days at 200°F. under 0.7 pound per square inch pressure, they are readily separated. An inflatable air-bag formed from this laminate with the paper-bearing surfaces inside and stored for a long period of time retains its ready inflatability.

3. Procedure 2 is repeated substituting for the binding polymer in the formulation for coating the nylon fabric, a 50 percent solids aqueous dispersion of an emulsion copolymer, having a $t_i$ of $-25°F$., of about 76 percent butyl acrylate, about 10 percent acrylonitrile, about 10 percent methyl methacrylate, about 1.5 percent N-methylolmethacrylamide and about 2.5 percent of $\beta$-hydroxyethyl methacrylate.

The resulting air-bag retains its flexibility and is crack-resistant down to temperatures as low as $-20°F$. It is also readily inflatable even after storing in collapsed condition for 7 days at 200°F. and 0.7 psi.

4. Procedure 3 is repeated except that there is added to the coating formulation 4 parts, per 100 parts solids of the emulsion copolymer, of a 50 percent solution in water of a melamine/formaldehyde condensate and 2 parts of an aqueous solution containing 20 percent of dichloroacetic acid. Similar results are obtained, the fabric of the bag wall being only slightly stiffer than in 3.

5. Procedure 2 is repeated substituting for the binding polymer in the formulation for coating the nylon fabric, a 50 percent solids aqueous dispersion of an emulsion copolymer, having a $T_i$ of $-27°F$. of about 50 percent 2-ethylhexyl acrylate, about 15 percent styrene, about 25 percent ethyl methacrylate, 5 percent methacrylic acid and 5 percent $\beta$-hydroxypropyl acrylate.

The resulting air-bag retains its flexibility and is crack-resistant down to temperatures as low as $-20°F$. It is also readily inflatable even after storing in collapsed condition for 7 days at 200°F. and 0.7 psi.

6. Procedure 5. is repeated except that there is added to the coating formulation 4 parts, per 100 parts solids of the emulsion copolymer, of a 50 percent solution in water of a melamine/formaldehyde condensate and 2 parts of an aqueous solution containing 20 percent of dichloroacetic acid. Similar results are obtained, the fabric of the bag wall being only slightly stiffer than in 5.

7. Procedure 3 is repeated substituting for the binding polymer in the formulation for coating the nylon fabric, a b50 percent solids aqueous dispersion of an emulsion copolymer, having a $T_i$ of $-41°F$., of about 97 percent n-butyl acrylate and 3 percent glycidyl methacrylate.

The resulting air-bag retains its flexibility and is crack-resistant down to temperatures as low as $-30°F$. It is also readily inflatable even after storing in collapsed condition for 7 days at 200°F. and 0.7 psi.

8. Procedure 2 is repeated except instead of the nylon fabric there is used a fabric of similar construction but made of poly(ethylene glycol terephthalate) fibers. Similar results are obtained. The laminate is also formed into an air mattress having longitudinal lines of adhesion joining the opposed envelope walls. Additional pieces of the laminate are sealed together in the form of a cylindrical ottoman which is largely but not completely filled with water, thereby providing a resilient seat or cushion which is adapted to conform to the contours of a person seated upon it. 9. Procedure 2 is repeated substituting for the binding polymer in the formulation for coating the nylon fabric, a 50 percent solids aqueous dispersion of an emulsion copolymer, having a $T_i$ of $-35°F$., of about 80 percent n-butyl acrylate, about 15 percent methyl methacrylate and about 5 percent of 4-pentenoguanamine. Similar results are obtained, the laminate retaining flexibility and freedom from cracking under the cold flexing test down to $-30°F$.

10. Procedure 2 is repeated substituting for the binding polymer in the formulation for coating the nylon fabric, a 50 percent solids aqueous dispersion of an emulsion copolymer, having a $T_i$ of $-35°F$., of about 80 percent n-butyl acrylate, about 15 percent methyl methacrylate and about 5 percent of $\beta$-ureidoethyl methacrylate. Similar results are obtained, the laminate retaining flexibility and freedom from cracking under the cold flexing test down to $-30°F$.

11. Procedures 1 a and d are repeated several times except in part d a respective one of the following fibrous materials is deposited on the exposed surface of the coated face of the fabric:
 a. A non-woven web of a mixture of fibers (35 percent rayon and 65 percent poly(ethylene glycol terephthalate)) obtained by carding and weighing 2 oz. per sq. yd.
 b. A cotton floc.
 c. A thin woven nylon gauze (2 ½ oz. per sq. yd.).
In all cases, the resulting laminate is block-resistant.

12. Procedure 1 a through d is repeated except that instead of applying the aqueous dispersion in 1 a, a 40 percent solution, having a viscosity of 12,000 cps, of a copolymer of 35 percent ethyl acrylate, 62 percent n-butyl acrylate, and 3 percent glycidyl methacrylate having a $T_i$ of $-30°F$. is knife-coated on the fabric to form a coating on drying of 2 mils thickness. The coated fabric remains flexible and resistant to cracking by the cold flex test down to −20°F. The lamination of the tissue paper thereon includes curing at 300°F. for 10 seconds.

The results obtained are similar to those obtained in procedure 1

13. Procedure 1 a through d is repeated except that in applying the aqueous dispersion in 1 a, a 50 percent solids solution in a 50/50 mixture of isopropyl acetate/xylene having a viscosity of about 25,000 cps. is applied. The solution contains a copolymer of 24 percent ethyl acrylate, 70 percent butyl acrylate, 4 percent hydroxyethyl methacrylate, and 2 percent acrylic acid having a $T_i$ of −30°F. and 3 percent, based on the weight of the polymer, of a melamine/formaldehyde condensate. The coated fabric remains flexible and resistant to cracking by the cold flex test down to −30°F. The lamination of the tissue paper is prolonged to a period of 10 seconds to cure the polymer.

The results obtained are similar to those obtained in procedure 1.

I claim:

1. An envelope, enclosing a fluid therein or adapted to be filled with fluid, having a wall formed of a textile fabric coated at least on its internal surface with a continuous film of an acrylic polymer having an apparent second order transition temperature of −20°F. or lower when determined at a modulus of rigidity of 300 kg./cm.$^2$ whereby the coated fabric retains flexibility at least down to −20°F. and is resistant to cracking when flexed at least down to −20°F.

2. An envelope according to claim 1 which is at least partially filled with water.

3. An envelope according to claim 1 which is filled with air or other gaseous fluid.

4. An envelope according to claim 1 wherein the internal acrylic coating carries adhered thereto a layer of fibrous material.

5. An envelope according to claim 4 having a tube communicating the interior with the exterior of the envelope, the envelope being readily fillable with liquid even after storage in collapsed condition wherein juxtaposed internal surfaces of the envelope walls have an extensive area of contact, the juxtaposed fiber-faced internal surfaces being resistant to blocking when pressed together under 0.7 lbs. per sq. in. pressure for 7 days at 200°F.

6. An envelope according to claim 1 in which the polymer of the continuous film is a polymer of butyl acrylate.

7. An envelope according to claim 5 in which the polymer of the continuous film is the heat-cured product of a self-reactive or self-curing copolymer of butyl acrylate.

8. An envelope according to claim 7 in which the polymer of the continuous film is the heat-cured product of a copolymer of butyl acrylate containing about 0.2 percent by weight of units containing glycidyl groups or N-methylol- or N-alkoxymethyl- substituted carboxylamide, ureido, or amino groups, the nitrogen of the amino groups being attached directly to a carbon atom in a 1, 3, 5-triazine ring.

9. An envelope according to claim 8 in which the fabric is a nylon fabric.

10. An envelope according to claim 8 in which the polymer of the continuous film is the heat-cured product of a mixture of (a) a poly(vic-epoxy), an aminoplast, or a phenoplast resin-forming condensate and (b) a copolymer of butyl acrylate with a monomer containing a group that is co-reactive with (a).

* * * * *